United States Patent
Lovegreen

(10) Patent No.: US 9,551,984 B2
(45) Date of Patent: Jan. 24, 2017

(54) SYSTEM AND METHOD FOR PROGRAMMING STACKED PROGRAMMABLE DEVICES IN A SEQUENCE

(71) Applicant: Kenneth J. Lovegreen, Lake Kiowa, TX (US)

(72) Inventor: Kenneth J. Lovegreen, Lake Kiowa, TX (US)

(73) Assignee: TEZ Presto, LLC, Frisco, TX (US)

( * ) Notice: Subject to any disclaimer, the term of this patent is extended or adjusted under 35 U.S.C. 154(b) by 481 days.

(21) Appl. No.: 14/133,913

(22) Filed: Dec. 19, 2013

(65) Prior Publication Data

US 2015/0177713 A1   Jun. 25, 2015

(51) Int. Cl.
*G05B 19/042*   (2006.01)

(52) U.S. Cl.
CPC . *G05B 19/0426* (2013.01); *G05B 2219/15076* (2013.01); *G05B 2219/23294* (2013.01); *G05B 2219/25336* (2013.01)

(58) Field of Classification Search
CPC .. H04W 68/00; H04W 84/025; H04W 88/022; H04W 4/12; H04W 84/022; H04W 76/02; H04W 68/02
USPC ......................................................... 340/7.2
See application file for complete search history.

(56) References Cited

U.S. PATENT DOCUMENTS

| | | | |
|---|---|---|---|
| 6,960,988 B2 | 11/2005 | Blink et al. | |
| 7,636,796 B2 * | 12/2009 | Zhao | G06F 15/7867 361/790 |
| 7,652,558 B2 | 1/2010 | Lovegreen et al. | |
| 7,978,067 B2 * | 7/2011 | Wagner | G06Q 10/08 340/286.02 |
| 8,045,967 B2 | 10/2011 | Lovegreen et al. | |
| 8,335,709 B2 | 12/2012 | Todd et al. | |
| 9,297,839 B2 * | 3/2016 | Romney | A01G 25/165 |

* cited by examiner

*Primary Examiner* — Mark Blouin
(74) *Attorney, Agent, or Firm* — Steven W. Smith

(57) ABSTRACT

A system, method and control unit for determining an order of a plurality of stacked electronic devices randomly ordered in a stack, for taking inventory of the devices, and for programming the devices according to the determined order. Each of the electronic devices is assigned a unique serial number, and the electronic devices are configured to report their serial numbers to the control unit in sequence, either upward or downward, in the stack. The control unit is configured to determine an order of the plurality of electronic devices in the stack based on the sequence in which the identifiers are received, to compare the sequence numbers to a known list to determine if any devices are missing, and to program the devices according to the determined order.

18 Claims, 5 Drawing Sheets

SYSTEM AND METHOD FOR PROGRAMMING STACKED PROGRAMMABLE DEVICES IN A SEQUENCE

BACKGROUND

Technical Field

This invention relates to computer programming systems and, more particularly, to a programming system and method for programming stacked programmable devices in a known sequence.

Description of Related Art

Some business establishments utilize mobile electronic devices for communication, data collection, data dissemination, and the like. These devices require periodic recharging and in some cases, reprogramming.

In some systems, the electronic devices are recharged and reprogrammed by placing the pager devices in matching slots in a charging and programming rack. Other systems do not require a rack. Instead, the devices are equipped with charging and data pins on their top and bottom surfaces, and the devices are merely stacked on top of each other, on top of a charging and programming base. Programming information may be sent to the base by a wired or wireless connection.

SUMMARY

All mobile electronic devices require that their batteries be periodically recharged. In addition, it is often necessary to identify specific electronic devices to receive a particular programming change or update. With racked systems, manual labor is required to ensure each pager device is placed in a slot having a serial number matching the serial number of the device so that the devices can be properly reprogrammed. With stacked systems, manual labor is required to individually reprogram each device. Manual labor is also required to take inventory, generally by verifying each device's serial number is present.

It would be advantageous, therefore, to have a recharging and reprogramming system and method that overcomes these disadvantages. The present invention provides such a system and method.

The present invention provides a system and method that allows restaurant personnel to stack the pager devices in random order. The devices, through the different embodiments described herein, report their stacked order to a programming controller. The controller then ensures each device is properly programmed.

In one embodiment, the present invention is directed to a method of determining an order of a plurality of stacked electronic devices randomly ordered in a stack. The method includes receiving in a control unit, an identifier of each device in sequence in the stack; and determining by the control unit, the order of the plurality of stackable electronic devices in the stack based on the sequence in which the identifiers are received. In two alternative embodiments, the devices report serial numbers in an upward or a downward direction in the stack.

In another embodiment, the present invention is directed to a method of programming a plurality of stacked electronic devices randomly ordered in a stack, wherein each device in the stack includes a data receiver on a bottom surface of the device and a data transmitter on a top surface of the device. The method includes receiving by a bottom device in the stack, an instruction from a control unit instructing the bottom device to program itself as device number one; the bottom device in the stack sending via its data transmitter, an instruction to a next higher device in the stack to program itself as device number two; and each subsequent higher device in the stack sending via its data transmitter, an instruction to a next higher device in the stack to program as an incremented device number until all devices in the stack have received a device number for programming. The devices in the stack then program themselves with the device numbers received.

In another embodiment, the present invention is directed to a control unit for determining an order of a plurality of stacked electronic devices randomly ordered in a stack. The control unit includes a processor and a memory for storing computer program instructions, and when the processor executes the computer program instructions, the control unit is caused to receive an identifier of each device in sequence in the stack; and determine the order of the plurality of stackable electronic devices in the stack based on the sequence in which the identifiers are received. In two alternative embodiments, the control unit receives the device serial numbers in an upward or a downward direction in the stack.

In another embodiment, the present invention is directed to a system that includes a control unit and a plurality of electronic devices stacked in random order in a stack and in communication with the control unit. Each of the electronic devices is assigned a unique identifier, and the electronic devices are configured to report their identifiers to the control unit in sequence in the stack. The control unit is configured to determine an order of the plurality of electronic devices in the stack based on the sequence in which the identifiers are received. In two alternative embodiments, the control unit receives the device serial numbers in an upward or a downward direction in the stack.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention. The invention may be implemented in hardware or in a combination of hardware and software. For example, one or more computers or processors may perform the steps of the method of the present invention when executing computer program instructions stored in one or more program memories. Additionally, individual components of the invention may include their own processor and memory for controlling their functions.

By way of example, the electronic devices are described herein as being pager devices, although the invention is equally applicable to other mobile electronic devices such as survey devices, calculators, tablet computers, laptop computers, smartphones, Personal Digital Assistants (PDAs), and the like that have been modified with charging pins, data pins, and/or short range data transmitters and receivers such as Infrared (IR) transmitters and receivers or radio frequency (RF) transmitters and receivers.

Figure 1:
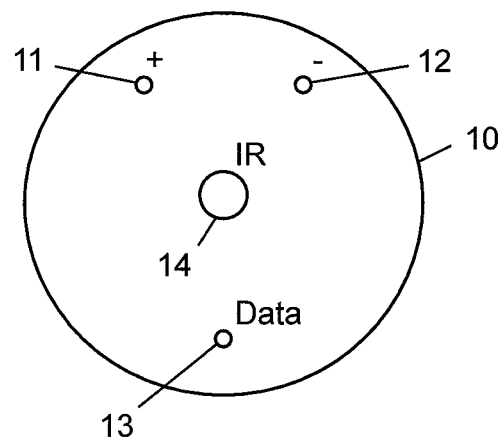
FIG. 1 is a bottom view of an exemplary embodiment of an electronic pager device of the present invention.

FIG. 1 is a bottom view of an exemplary embodiment of an electronic pager device 10 of the present invention. Although a round pager is shown, the invention is not limited to this particular shape, but may be applicable to devices that are square, rectangular, triangular, and other geometrical shapes.

The bottom of each device may include a first charging pin 11, a second charging pin 12, and a bi-directional data pin 13. The data pin provides a primary data connection with a base unit. In this embodiment, each device includes an additional data transmitter such as, for example, an Infrared (IR) transmitter 14 on the bottom of the device and an IR receiver on the top of the device. The IR transmitter is positioned to align with an IR receiver on the device stacked below. The IR connection provides a secondary data connection with devices above and below the device in the stack. This enables information such as device identifiers (for example serial numbers) to be passed downward from one device to another, as described in more detail in connection with FIG. 3 below. In an alternative embodiment, the IR transmitter is on the top of each device, and the IR receiver is on the bottom. This enables information such as device serial numbers to be passed upward from one device to another, as described in more detail in connection with FIG. 4 below.

The charging and data pins make contact with receptacles on the top of each device that align with and contact the pins when the devices are stacked on top of each other. In one embodiment, the first charging pin provides DC power and the second charging pin is Ground, utilized to recharge a rechargeable battery in the device 10. When multiple devices are stacked, the data pin essentially provides a data bus for data between the base unit and each device in the stack. The base unit may also use the data bus to provide a reset command to the device and other devices stacked on top of it by, for example, presenting a negative voltage on the data pin. In an alternative embodiment, there are only two pins, one for DC power and one for Ground. In this embodiment, the data may be modulated on the power signal.

Figure 2:
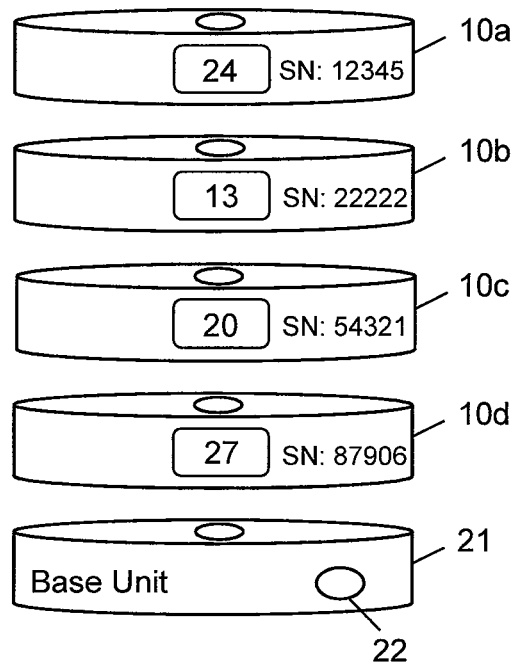
FIG. 2 is a side view of an exemplary embodiment of a plurality of pager devices shown in a stacked random sequence on top of a base unit.

FIG. 2 is a side view of an exemplary embodiment of a plurality of pager devices 10a-10d shown in a stacked random sequence on top of a base unit 21. Although the devices are shown physically separated for illustrative purposes, the devices would be stacked in contact with each other so that the charging and data pins on each device would make contact with the device above and the device below each device. Each device has a program number and a unique serial number. The serial number is unchangeable and is assigned at time of manufacturing.

The base unit 21 is shown in this embodiment to include a programming button 22 for initiating the programming of the devices 10a-10d stacked on top of the base unit. The base unit also includes a charger for recharging the batteries of the stacked pager devices. The charger may be "smart" and may connect to a computer via a wireless connection such as Wi-Fi, or via a cable.

Figure 3:
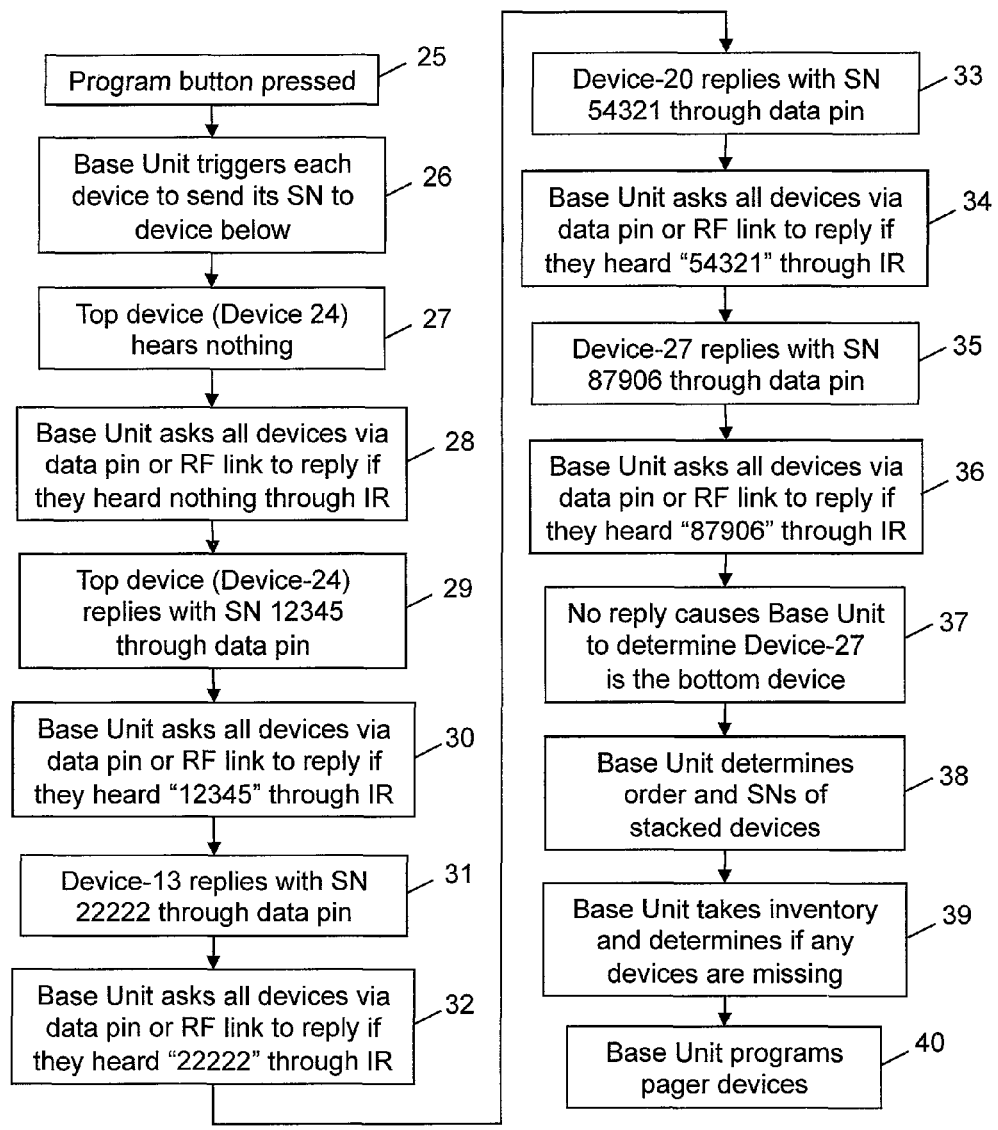
FIG. 3 is a flow chart showing a first exemplary embodiment of a method of taking inventory and programming the randomly stacked pager devices of FIG. 2.

FIG. 3 is a flow chart showing a first exemplary embodiment of a method of taking inventory and programming the randomly stacked pager devices 10a-10d of FIG. 2. This method utilizes the version of the pager device having the IR transmitter on the bottom and the IR receiver on the top. Thus, information can be carried by IR signaling only in the downward direction in the stack.

At step 25, the programming button 22 is pressed. At step 26, the base unit 21 sends a signal via the data pin or a radio frequency (RF) link to all of the pager devices triggering each device to send its serial number via IR signaling to the device below. Thus, each pager device, except the top device (Device-24) hears the serial number of the device above it. At step 27, the top device determines that it heard nothing (for example within a defined time period). At step 28, the base unit sends a query ("Inquiry") message via the data pin or RF link to all of the pager devices in the stack asking any device that heard nothing through its IR receiver to reply with its serial number. At step 29, the top device replies to the base unit via the data pin or RF link with its serial number "12345". This enables the control unit to determine that Device-24 is the top device. At step 30, the base unit sends a query message to the stack asking any device that heard "12345" through its IR receiver to reply with its serial number. At step 31, Device-13 replies to the base unit via the data pin or RF link with its serial number "22222". At step 32, the base unit sends a query message to the stack asking any device that heard "22222" through its IR receiver to reply with its serial number. At step 33, Device-20 replies to the base unit via the data pin or RF link with its serial number "54321". At step 34, the base unit sends a query message to the stack asking any device that heard "54321" through its IR receiver to reply with its serial number. At step 35, Device-27 replies to the base unit via the data pin or RF link with its serial number "87906". At step 36, the base unit sends a query message to the stack asking any device that heard "87906" to reply with its serial number. Since Device-27 is the bottom device, no reply is received, and at step 37, the base unit determines that Device-27 is the top device.

In this way, the base unit collects all of the information about the stacked devices and at step 38, the base unit determines the order in which the devices are stacked, and their corresponding serial numbers. Thus, the base unit can easily and quickly take inventory and determine at step 39 whether there are any missing devices. The base unit may make this determination by comparing the serial numbers reported from the stack with a known listing of the serial numbers of all pager devices at the premises. At step 40, the program controller programs each of the pager devices. This may be done with or without taking inventory, and may be based on Dipswitch settings or settings received via a wired network connection, wireless connection such as Wi-Fi, or directly from a connected computer.

The base unit may also be configured to control multiple stacks of pager devices. In this case, the base unit may be configured to take inventory of each stack and program the devices in each stack according to each detected serial number.

Figure 4:
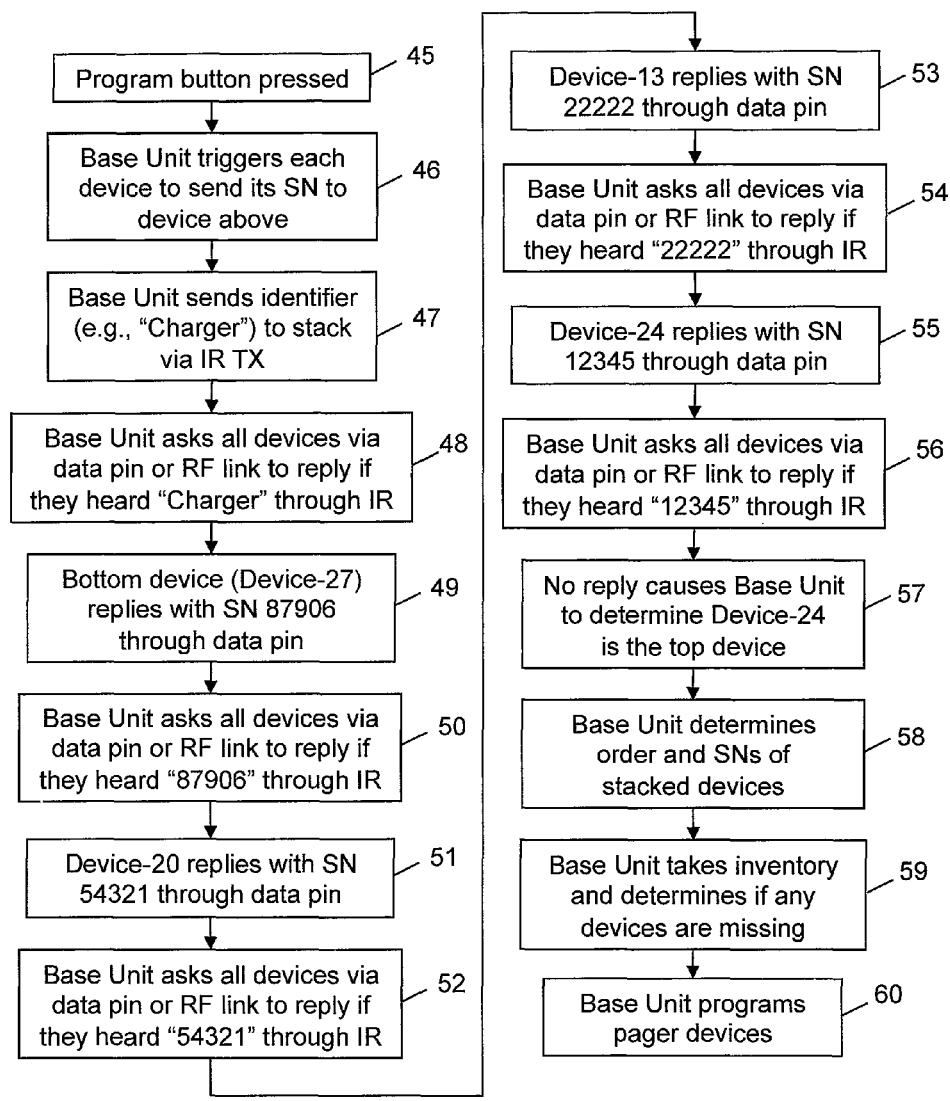
FIG. 4 is a flow chart showing a second exemplary embodiment of a method of taking inventory and programming the randomly stacked pager devices of FIG. 2.

FIG. 4 is a flow chart showing a second exemplary embodiment of a method of taking inventory and programming the randomly stacked pager devices 10a-10d of FIG. 2. This method utilizes the version of the pager device having the IR transmitter on the top and the IR receiver on the bottom. Thus, information can be carried by IR signaling only in the upward direction in the stack.

At step 45, the programming button 22 is pressed. At step 46, the base unit 21 sends a signal via the data pin or a radio frequency (RF) link to all of the pager devices triggering each device to send its serial number via IR signaling to the device above. Thus, each pager device, except the bottom device (Device-27) hears the serial number of the device below it. At step 47, the base unit 21 sends an IR signal to the pager device stack with an identifier for the base unit such as "Charger". At step 48, the base unit sends a query ("Inquiry") message via the data pin or RF link to all of the pager devices in the stack asking any device that heard "Charger" to reply with its serial number. Only the bottom device (Device-27) could receive this IR signal, so at step 49, Device-27 replies to the base unit via the data pin or RF link with its serial number "87906". This enables the control unit to determine that Device-27 is the bottom device. At step 50, the base unit sends a query message to the stack asking any device that heard "87906" through its IR receiver to reply with its serial number. At step 51, Device-20 replies to the base unit via the data pin or RF link with its serial number "54321". At step 52, the base unit sends a query message to the stack asking any device that heard "54321" through its IR receiver to reply with its serial number. At step 53, Device-13 replies to the base unit via the data pin or RF link with its serial number "22222". At step 54, the base unit sends a query message to the stack asking any device that heard "22222" through its IR receiver to reply with its serial number. At step 55, Device-24 replies to the base unit via the data pin or RF link with its serial number "12345". At step 56, the base unit sends a query message to the stack asking any device that heard "12345" to reply with its serial number. Since Device-24 is the top device, no reply is received, and at step 57, the base unit determines that Device-24 is the top device.

In this way, the base unit collects all of the information about the stacked devices and at step 58, the base unit determines the order in which the devices are stacked, and their corresponding serial numbers. Thus, the base unit can easily and quickly take inventory and determine at step 59 whether there are any missing devices. The base unit may make this determination by comparing the serial numbers reported from the stack with a known listing of the serial numbers of all pager devices at the premises. At step 60, the program controller programs each of the pager devices. This may be done with or without taking inventory, and may be based on Dipswitch settings or settings received via a wired network connection, wireless connection such as Wi-Fi, or directly from a connected computer.

Figure 5:
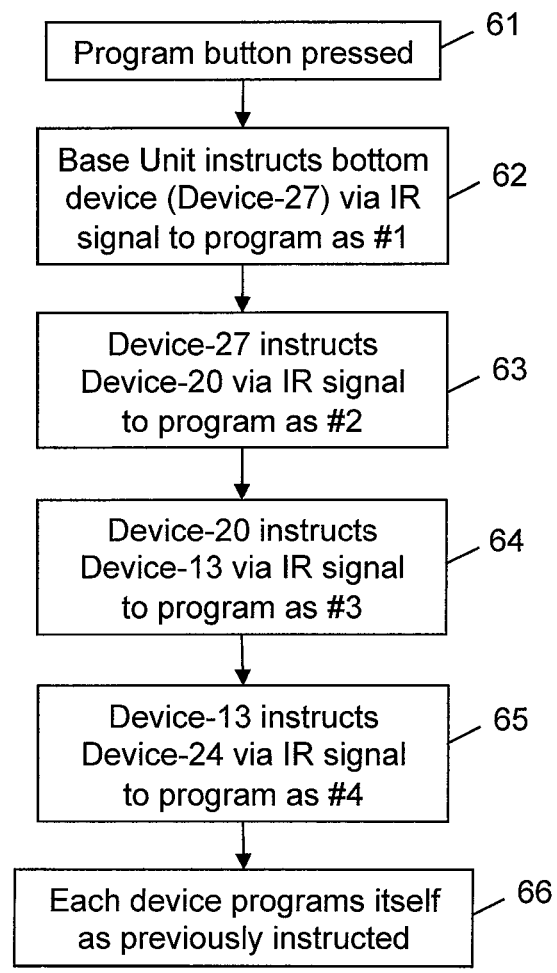
FIG. 5 is a flow chart showing an exemplary embodiment of an alternative method of programming the randomly stacked pager devices of FIG. 2.

FIG. 5 is a flow chart showing an exemplary embodiment of an alternative method of programming the randomly stacked pager devices 10a-10d of FIG. 2. In this embodiment, the base unit reprograms the pager devices without taking inventory and without considering the device serial numbers. This method utilizes the version of the pager device having the IR transmitter on the top and the IR receiver on the bottom. Thus, information can be carried by IR signaling only in the upward direction in the stack. In addition, only the power and ground charging pins 11-12 are required since no data has to be sent through the data pin 13 present in other embodiments.

At step 61, the programming button 22 is pressed. At step 62, the base unit sends an IR signal to the bottom device, Device-27, instructing it to "Program as #1". At step 63, Device-27 then sends an IR signal upward to Device-20 instructing Device-20 to "Program as #2". At step 64, Device-20 then sends an IR signal upward to Device-13 instructing Device-13 to "Program as #3". At step 65, Device-13 then sends an IR signal upward to Device-24 instructing Device-24 to "Program as #4". At step 66, each pager device programs itself as instructed. The first number in the sequence may be set via a wired network connection, wireless connection such as Wi-Fi, or directly from a connected computer.

Figure 6:
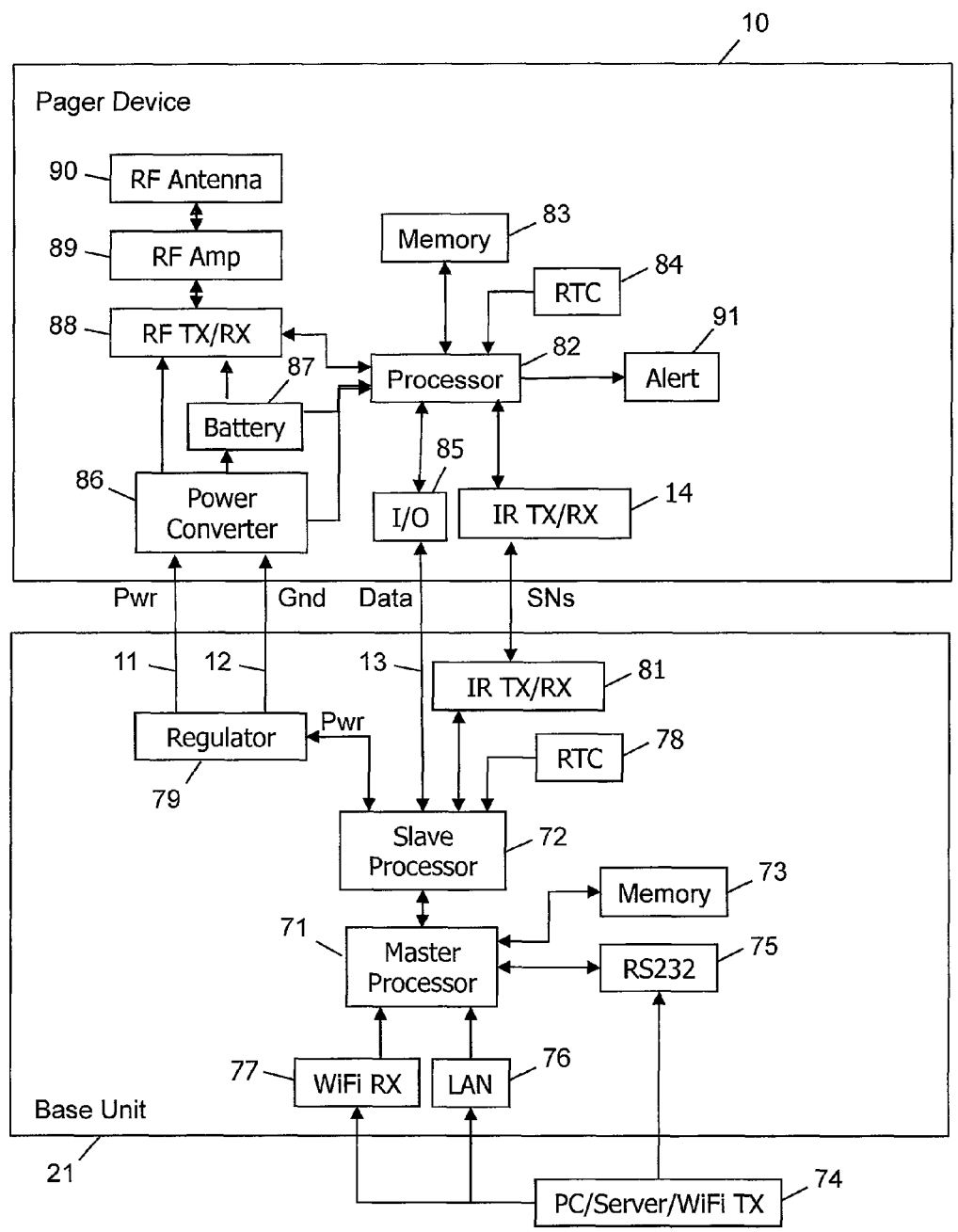
FIG. 6 is a simplified block diagram of an exemplary embodiment of the system of the present invention.

FIG. 6 is a simplified block diagram of an exemplary embodiment of the system of the present invention. The system includes the base unit 21 and one of the paging devices 10. Operation of the base unit may be controlled by a master processor 71 and a slave processor 72. The processors execute computer program instructions stored on a memory device 73. The master processor may interface with an external source of programming instructions for both the base unit and the pager device such as an external PC or server or WiFi transmitter 74. For example, the PC may interface with the base unit directly through an RS232 interface 75. The server may interface through a Local Area Network (LAN) interface 76. The WiFi transmitter may interface through a WiFi receiver 77. Operating instructions may be executed in accordance with a real time clock (RTC) 78.

The slave processor 72 may control a number of functions relating to the pager device 10. A power regulator 79 may connect to the charging pins 11-12. The slave processor may also control the flow of data through the data pin 13 and IR signals sent or received through an IR transmitter or receiver 81.

Operations of the pager device 10 may be controlled by a processor 82 executing computer program instructions stored on a memory device 83. Operating instructions may be executed in accordance with an RTC 84. Data may be transmitted or received on the data pin 13 via a two-way input/output (I/O) device 85. IR signals may be sent or received through the IR transmitter or receiver 14. Power received on the charging pins 11-12 is converted by a power converter 86 for charging a battery 87 and for operating the other components of the pager device. As in a normal pager, the pager device includes an RF transceiver 88, an RF amplifier 89, and an RF antenna 90. RF paging signals received by the paging device and intended for the paging device cause an alerting mechanism 91 such as lights, vibrator, or audible alarm to actuate.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of determining an order of a plurality of stacked electronic devices randomly ordered in a stack, said method comprising:
receiving in a control unit, an identifier of each device in sequence in the stack; and
determining by the control unit, the order of the plurality of stackable electronic devices in the stack based on the sequence in which the identifiers are received;

wherein the identifier for each device is a unique serial number, and each given device includes a primary data connection for communicating with the control unit and a secondary data connection comprising a receiver on a top surface of the given device and a transmitter on a bottom surface of the given device, wherein the method further comprises:

the control unit instructing the devices via the primary data connection to send their serial numbers downward through the stack via the secondary data connection;

the control unit requesting any device that heard nothing through the secondary data connection to reply to the control unit with the device's serial number;

receiving by the control unit, a serial number from the top device;

the control unit requesting any device that received the serial number of the top device to reply with its serial number;

receiving by the control unit, a serial number from a next device below the top device;

repeating the requesting and receiving steps for each subsequent serial number until no reply is received; and determining that the last received serial number corresponds to a bottom device on the stack.

2. The method according to claim 1, wherein the secondary data connection is an Infrared (IR) data connection.

3. The method according to claim 1, further comprising determining by the control unit, whether any of a known listing of stackable electronic devices is missing from the stack.

4. The method according to claim 1, further comprising programming the plurality of stackable electronic devices according to the determined order of the devices.

5. A method of determining an order of a plurality of stacked electronic devices randomly ordered in a stack, said method comprising:

receiving in a control unit, an identifier of each device in sequence in the stack; and determining by the control unit, the order of the plurality of stackable electronic devices in the stack based on the sequence in which the identifiers are received;

wherein the identifier for each device is a unique serial number, and each given device includes a primary data connection for communicating with the control unit and a secondary data connection comprising a transmitter on a top surface of the given device and a receiver on a bottom surface of the given device, wherein the method further comprises:

the control unit instructing the devices via the primary data connection to send their serial numbers upward through the stack via the secondary data connection;

the control unit sending a control unit identifier to a bottom device on the stack via the secondary data connection;

the control unit requesting any device that received the control unit identifier to reply with its serial number;

receiving by the control unit, a serial number from the bottom device;

the control unit requesting any device that received the serial number of the bottom device to reply with its serial number;

receiving by the control unit, a serial number from a next device above the bottom device;

repeating the requesting and receiving steps for each subsequent serial number until no reply is received; and determining that the last received serial number corresponds to a top device on the stack.

6. The method according to claim 5, wherein the secondary data connection is an Infrared (IR) data connection.

7. A method of programming a plurality of stacked electronic devices randomly ordered in a stack, wherein each device in the stack includes a data receiver on a bottom surface of the device and a data transmitter on a top surface of the device, said method comprising:

receiving by a bottom device in the stack, an instruction from a control unit to program itself as device number one;

the bottom device in the stack sending via its data transmitter, an instruction to a next higher device in the stack to program itself as device number two;

each subsequent higher device in the stack sending via its data transmitter, an instruction to a next higher device in the stack to program as an incremented device number until all devices in the stack have received a device number for programming; and each device in the stack programming itself as the device number received.

8. The method according to claim 7, wherein the data receiver and data transmitter of each device are configured to receive and transmit, respectively, through a modulated charging pin.

9. A control unit for determining an order of a plurality of stacked electronic devices randomly ordered in a stack, wherein the control unit includes a processor and a memory for storing computer program instructions, wherein when the processor executes the computer program instructions, the control unit is caused to:

receive an identifier of each device in sequence in the stack; and determine the order of the plurality of stackable electronic devices in the stack based on the sequence in which the identifiers are received.

10. The control unit according to claim 9, wherein the identifier for each device is a unique serial number, and the control unit includes a primary data connection for simultaneously communicating with the plurality of stacked electronic devices and a secondary data connection for receiving serial number information from a bottom device in the stack;

wherein each given device includes an interface to the primary data connection for communicating with the control unit and a secondary data interface comprising a receiver on a top surface of the given device and a transmitter on a bottom surface of the given device;

wherein the control unit is configured to:

instruct the devices via the primary data connection to send their serial numbers downward through the stack via the secondary data connection;

request any device that heard nothing through the secondary data connection to reply to the control unit with the device's serial number;

receive a serial number from the top device;

request any device that received the serial number of the top device to reply with its serial number;

receive a serial number from a next device below the top device;

repeat the requesting and receiving steps for each subsequent serial number until no reply is received; and determine that the last received serial number corresponds to a bottom device on the stack.

11. The control unit according to claim 10, wherein the secondary data connection is an Infrared (IR) data connection.

12. The control unit according to claim 9, wherein the identifier for each device is a unique serial number, and the control unit includes a primary data connection for simultaneously communicating with the plurality of stacked electronic devices and a secondary data connection for transmitting information to a bottom device in the stack;
   wherein each given device includes an interface to the primary data connection for communicating with the control unit and a secondary data interface comprising a transmitter on a top surface of the given device and a receiver on a bottom surface of the given device;
   wherein the control unit is configured to:
      instruct the devices via the primary data connection to send their serial numbers upward through the stack via the secondary data connection;
      send a control unit identifier to a bottom device on the stack via the secondary data connection;
      request any device that received the control unit identifier to reply with its serial number;
      receive a serial number from the bottom device;
      request any device that received the serial number of the bottom device to reply with its serial number;
      receive a serial number from a next device above the bottom device;
      repeat the requesting and receiving steps for each subsequent serial number until no reply is received; and
      determine that the last received serial number corresponds to a top device on the stack.

13. The control unit according to claim 12, wherein the secondary data connection is an Infrared (IR) data connection.

14. The control unit according to claim 9, further configured to determine whether any of a known listing of stackable electronic devices is missing from the stack.

15. The control unit according to claim 9, further configured to program the plurality of stackable electronic devices according to the determined order of the devices.

16. A system comprising:
   a control unit; and
   a plurality of electronic devices stacked in random order in a stack and in communication with the control unit;
   wherein each of the electronic devices is assigned a unique identifier, and the electronic devices are configured to report their identifiers to the control unit in sequence in the stack; and
   wherein the control unit is configured to determine an order of the plurality of electronic devices in the stack based on the sequence in which the identifiers are received.

17. The system according to claim 16, wherein the identifier for each device is a unique serial number, and the control unit includes a primary data connection for simultaneously communicating with the plurality of stacked electronic devices and a secondary data connection for receiving serial number information from a bottom device in the stack;
   wherein each given device includes an interface to the primary data connection for communicating with the control unit and a secondary data interface comprising a receiver on a top surface of the given device and a transmitter on a bottom surface of the given device;
   wherein the control unit is configured to:
      instruct the devices via the primary data connection to send their serial numbers downward through the stack via the secondary data connection;
      request any device that heard nothing through the secondary data connection to reply to the control unit with the device's serial number;
      receive a serial number from the top device;
      request any device that received the serial number of the top device to reply with its serial number;
      receive a serial number from a next device below the top device;
      repeat the requesting and receiving steps for each subsequent serial number until no reply is received; and
      determine that the last received serial number corresponds to a bottom device on the stack.

18. The system according to claim 16, wherein the identifier for each device is a unique serial number, and the control unit includes a primary data connection for simultaneously communicating with the plurality of stacked electronic devices and a secondary data connection for transmitting information to a bottom device in the stack;
   wherein each given device includes an interface to the primary data connection for communicating with the control unit and a secondary data interface comprising a transmitter on a top surface of the given device and a receiver on a bottom surface of the given device;
   wherein the control unit is configured to:
      instruct the devices via the primary data connection to send their serial numbers upward through the stack via the secondary data connection;
      send a control unit identifier to a bottom device on the stack via the secondary data connection;
      request any device that received the control unit identifier to reply with its serial number;
      receive a serial number from the bottom device;
      request any device that received the serial number of the bottom device to reply with its serial number;
      receive a serial number from a next device above the bottom device;
      repeat the requesting and receiving steps for each subsequent serial number until no reply is received; and
      determine that the last received serial number corresponds to a top device on the stack.

* * * * *